MULTICHANNEL RADIANT ENERGY SIGNALING SYSTEM

Filed Oct. 18, 1954

4 Sheets-Sheet 1

INVENTORS D. MITCHELL
E. VROOM
W. R. YOUNG, JR.
BY [signature]
ATTORNEY

INVENTORS D. MITCHELL
E. VROOM
W. R. YOUNG, JR.
BY [signature]
ATTORNEY

Jan. 31, 1956 D. MITCHELL ET AL 2,733,337

MULTICHANNEL RADIANT ENERGY SIGNALING SYSTEM

Filed Oct. 18, 1954 4 Sheets-Sheet 3

INVENTORS D. MITCHELL
E. VROOM
W. R. YOUNG, JR.

BY B. F. Stoddard

ATTORNEY

Jan. 31, 1956 D. MITCHELL ET AL 2,733,337

MULTICHANNEL RADIANT ENERGY SIGNALING SYSTEM

Filed Oct. 18, 1954 4 Sheets-Sheet 4

INVENTORS D. MITCHELL
E. VROOM
W. R. YOUNG, JR.

BY F. Stoddard
ATTORNEY

United States Patent Office 2,733,337

Patented Jan. 31, 1956

2,733,337

MULTICHANNEL RADIANT ENERGY SIGNALING SYSTEM

Doren Mitchell, Martinsville, N. J., Edward Vroom, Brooklyn, Conn., and William R. Young, Jr., Summit, N. J., assignors to Bell Telephone Laboratories, Incorporated, New York, N. Y., a corporation of New York Application October 18, 1954, Serial No. 462,812

11 Claims. (Cl. 250—6)

This invention relates to multi-channel radiant energy signaling systems having transmitters and receivers which can be tuned to any of a number of radiant energy signaling channels; and, more particularly, to methods and means for automatically changing and stabilizing the tuning of these receivers.

Signaling systems of this type commonly employ superheterodyne receivers in which energy from a local beating oscillator is combined with received carrier energy to produce intermediate frequency energy. In many such systems, the receivers are tuned to the desired carrier by employing crystals for controlling the frequency of their beating oscillators. When it is required to change the tuning of a receiver for operation with a different carrier, another crystal must be substituted in the control circuit of the beating oscillator. Thus, a receiver which is to be used with a large number of channels must be equipped with a corresponding number of crystals and some means for individually switching them into and out of operation with the beating oscillator. In order to simplify the operation of a receiver, it would be desirable to use automatic means rather than manual means for switching the crystals. Aside from the expense of the crystals and their associated switching circuits, their bulk and weight are objectionable under certain circumstances, particularly when incorporated in receivers mounted in mobile installations, such as vehicles or aircraft.

Accordingly, it is an object of this invention to provide improved means for automatically changing the tuning of an oscillator in a radiant energy receiver for operation with any of a number of radiant energy signaling channels.

It is also an object of this invention to provide improved means for maintaining a constant fixed frequency separation between the operating frequency of a transmitting oscillator at a radiant energy signaling station and the instantaneous frequency of a variable-frequency beating oscillator at the same station.

An additional object of this invention is to provide improved means at signaling stations in a radiant energy signaling system for stabilizing the operating frequencies of transmitting and receiving oscillators located at these stations.

A further object of this invention is to reduce the inherent accuracy in frequency required of oscillators at signaling stations in a multi-channel radiant energy signaling system.

These and other objects of the invention are attained in a multi-channel radiant energy signaling system by employing at its signaling stations electric tunable oscillators, such as injection magnetrons or high frequency triodes, and by controlling their frequency with automatic frequency control circuits responsive to various low frequency tones. In accordance with the invention, these oscillators are used as beating oscillators in the radiant energy receivers at the signaling stations and their frequency is varied over a relatively wide range in a saw-tooth manner so as to produce a cyclical scanning sweep in frequency over a number of radiant energy signaling channels. When the scan of one of these oscillators encounters a channel identified by a particular tone, the frequency-responsive control means stop the frequency-sweeping action of the oscillator and lock it to this channel. Any subsequent drifting in the frequency of this oscillator is compensated for by other automatic frequency control means. The oscillator in the radiant energy transmitter associated with each receiver is also an electric tunable oscillator but its average frequency is so controlled by the beating oscillator in the receiver through a discriminator and automatic frequency control circuit as to maintain a constant fixed frequency separation between it and the instantaneous frequency of its associated beating oscillator.

These and other features of the invention are more fully discussed in connection with the following detailed description of the drawing in which.

Figure 1:
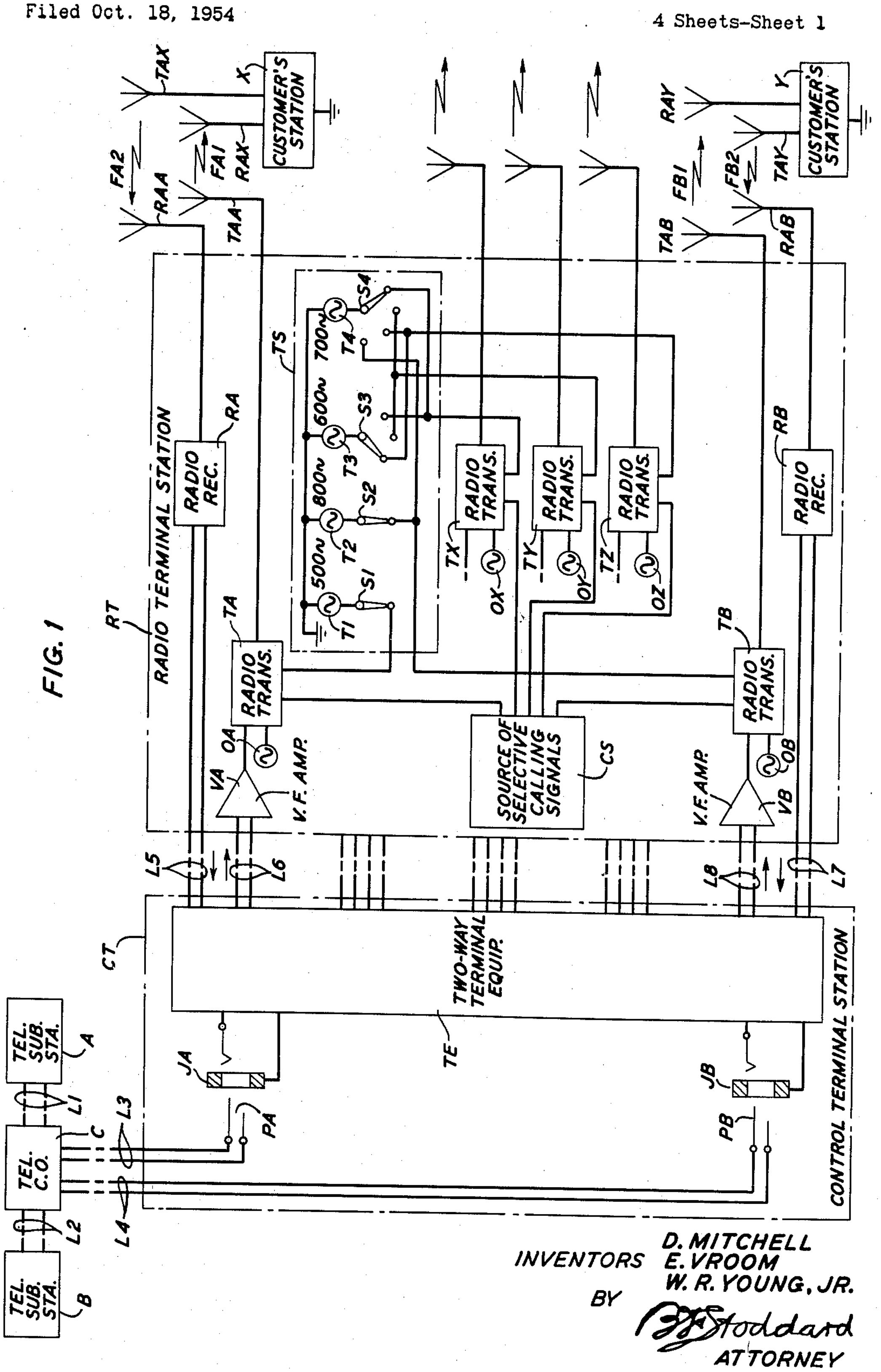
Fig. 1 is a schematic block diagram of a multi-channel radiant energy signaling system.
Figure 6:
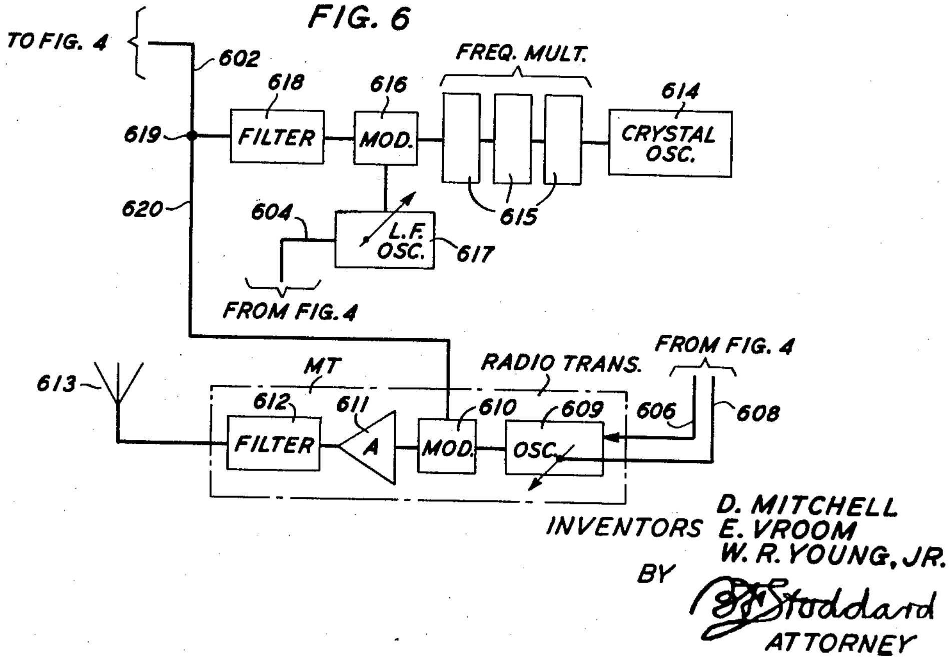
Figure 4:
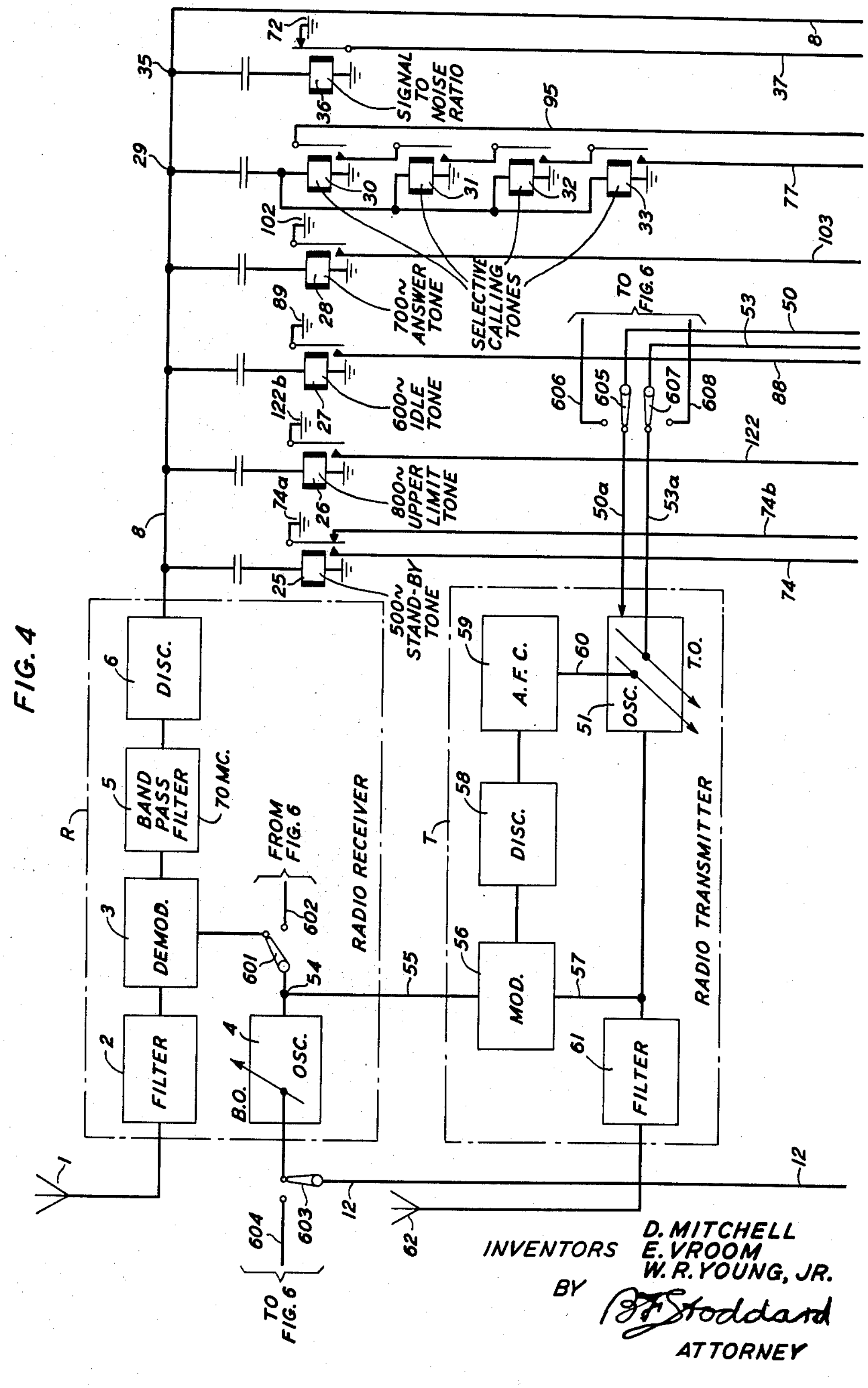
Figure 5:
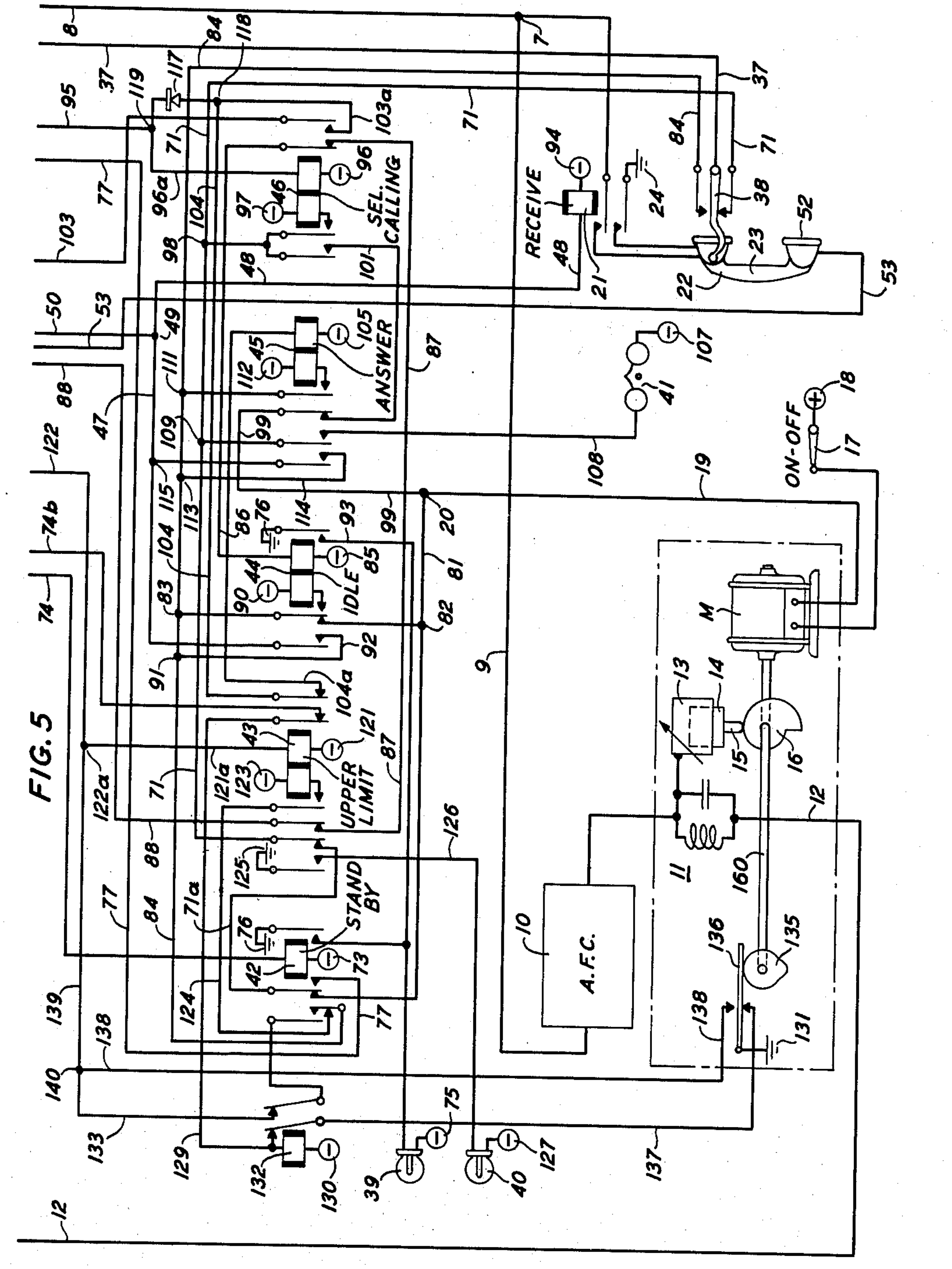

Figs. 4 and 5 together constitute a circuit diagram of the equipment at one of the signaling stations shown schematically in Fig. 1; and Fig. 6 is a block diagram of a modification of an alternative circuit construction of a portion of the station equipment shown in Fig. 4.

In Fig. 1, a multi-channel radiant energy signaling system, such as a radiotelephone system, is shown to include two telephone subscribers' stations A and B connected by wire lines L1 and L2, respectively, to a telephone central office C. It is to be understood that only two telephone subscribers' stations have been shown for the purpose of simplicity and that the system may actually include a large number of similarly connected telephone subscribers' stations. The telephone central office C is, in turn, connected by wire lines L3 and L4 to a control terminal station CT which is provided with two-way terminal equipment TE. The wire lines L3 and L4 are terminated in plugs PA and PB, respectively, for insertion into jacks JA and JB connected to the terminal equipment TE. The terminal equipment TE is connected by a number of wire lines, such as L5, L6, L7 and L8, to a radio terminal station RT.

At the radio terminal station RT, voice frequency signaling energy originating at the telephone subscribers' stations A and B and supplied over the lines L6 and L8 is amplified in voice frequency amplifiers VA and VB and is then applied, respectively, to radio transmitters TA and TB which may be of any suitable design known to those skilled in the art. Sources of carrier electric wave energy of different mean frequency values, represented by the oscillators OA and OB, are connected respectively to the radio transmitters TA and TB. This carrier energy is modulated in the radio transmitters TA and TB with the voice frequency signaling energy output from the amplifiers VA and VB in any suitable manner known to those skilled in the art. The resulting signal-modulated carrier waves are radiated by transmitting antennas TAA and TAB and are received respectively by receiving antennas RAX and RAY at two customers' radio telephone stations X and Y.

The radio terminal station RT is further provided with a source CS of selective calling signals connected to both the radio transmitters TA and TB so that an operator may apply selective calling signals to either of the transmitters TA or TB for modulating their carriers. As is well known in the art, the reception of these calling signals effects the ringing of a call bell or the lighting of a call lamp at the customers' stations X and Y. The source CS is also connected to other radio transmitters TX, TY, and TZ having connected thereto other sources of carrier electric wave energy of different mean frequency values represented by the oscillators OX, OY, and OZ, respectively. These additional radio transmitters have been shown for the purpose of indicating that the radio terminal station RT may include a large number of such transmitters for use with a large number of customers' stations.

The radio terminal station RT is also provided with a source TS of control tones which are connectable to different ones of the radio transmitters TA to TZ, inclusive. The control tones from the source TS are used to modulate the carriers produced by the radio transmitters TA to TZ, inclusive, with tone signals for supervisory and control purposes as is described in detail hereinafter. At this point, it is sufficient to state that a 500 cycle tone source T1 is indicated as being connected by a switch S1 to only the radio transmitter TA. This tone is used to indicate the stand-by channel of a particular group of channels and a different stand-by tone is used for each group of channels.

The source TS also includes a 600 cycle tone source T3 which is connectable by a switch S3 to any one of several of the radio transmitters, such as the transmitters TX, TY, or TZ, in order to denote an idle channel. Another tone source T4, which may be 700 cycles, is used to identify a channel over which a customer should answer a call from an operator at the radio terminal station RT. This 700 cycle tone may be applied over a switch S4 to any one of several radio transmitters, such as the transmitters TB, TX, TY, or TZ. Still another tone source T2, which may be 800 cycles, is connected by a switch S2 to only the radio transmitter TB for marking the channel of highest frequency in each group of channels. The functions performed by these tones when received at the customers' stations are fully described hereinafter.

It is to be understood that only two customers' stations X and Y have been shown for purposes of simplicity and that the system may actually include a large number of such stations, some or all of which may be mobile. The customers' stations X and Y are provided respectively with transmitting antennas TAX and TAY for transmitting signal-modulated carrier waves which are received respectively by receiving antennas RAA and RAB at the radio terminal station RT and are applied respectively to radio receivers RA and RB of any suitable design known to those skilled in the art. The resulting voice frequency signals produced by the radio receivers RA and RB are transmitted over the lines L5 and L7, respectively, to the two-way terminal equipment TE at the control terminal station CT and then over the lines L3 and L4, respectively, to the telephone central offive C and, finally, over the lines L1 and L2, respectively, to the telephone subscribers' stations A and B.

The system is, therefore, shown in Fig. 1 to be in the condition for the transmission of carrier waves having a mean frequency FA1 from the radio terminal station RT to the customer's station X and for the transmission of other carrier waves having a mean frequency FA2 from the customer's station X to the radio terminal station RT. The system is also shown to be in the condition for the transmission of carrier waves having a mean frequency value of FB1 from the radio terminal station RT to the customer's station Y and for the transmission of other carrier waves having a mean frequency FB2 from the customer's station Y to the radio terminal station RT. Although this multi-channel system is thus shown to be of the full duplex type, it is to be understood that the invention is not limited thereto but may be applied with advantage to other types of signaling systems.

On the basis of the above description, the two mean carrier frequencies FA1 and FA2 constitute one two-way radiant energy signaling channel allocation and the other mean carrier frequencies FB1 and FB2 constitute another two-way channel allocation, each carrier frequency being used for the transmission of signals in only the direction indicated in Fig. 1. In one embodiment of the invention, all the carrier frequencies allotted to the system are in the 470 megacycle range and the two carrier frequencies constituting each channel have a uniform and constant 20 megacycle frequency separation.

In the event that the system includes a large number of customers' stations, they may be divided into groups with the stations in one group being assigned for signaling purposes the channel constituted by the frequency allocations FA1 and FA2, while the stations in another group are assigned the channel constituted by the frequency allocations FB1 and FB2. It is to be understood that the system may be assigned a large number of channel allocations with several of these channels being allotted for use only with one group of customers' stations while other channels are allotted for use only with customers' stations in another group.

Figure 2:
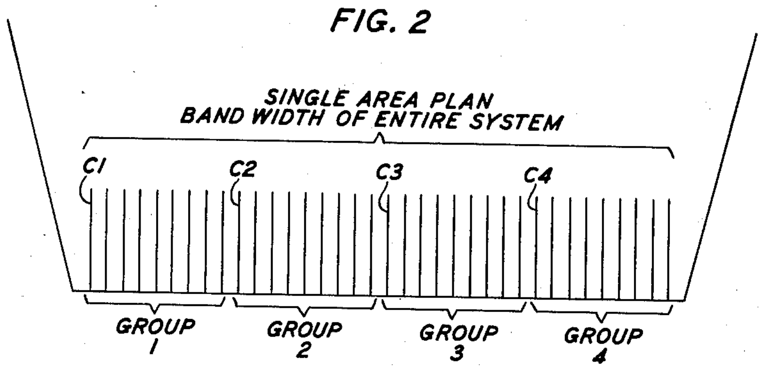
Fig. 2 illustrates a channel allocation plan for a multichannel radiant energy signaling system having a number of different groups of signaling stations located in a single service area.

When several groups of channels are thus assigned for use by respectively different groups of customers' stations, it is desirable to reserve one channel in each group of channels for the transmission of selective calling signals from the radio terminal station to the customers' stations. This is illustrated in Fig. 2 wherein the portion of the frequency spectrum assigned to the system is represented as being wide enough to permit 36 channel allocations. As is shown in Fig. 2, these channel allocations are divided into four groups each containing nine channels. Each group of channels is assigned for use by respectively different groups of customers' stations. All of the customers' stations in each group are permitted to use any of the channels in their respectively assigned group of channels with the exception of one channel in each group C1, C2, C3, or C4, respectively, which is reserved for selective calling purposes. As is indicated in Fig. 2, it is convenient to designate the first channel, or channel of lowest frequency, in each group as a calling channel.

In accordance with this assignment plan, when a call is to be placed from the radio terminal station to any one of the customers' stations, an operator at the terminal station will transmit the selective calling signal assigned to the desired customer's station and this signal will be transmitted over the calling channel reserved for that particular customer's group. In order to receive this calling signal, the called customer's radio equipment must be tuned to his assigned calling channel. Accordingly, whenever any of the customers' stations are idle or, in other words, are in a stand-by condition, their radio equipments should be automatically tuned to their respectively assigned calling channels C1, C2, C3, or C4. Each of these stand-by channels is identified or marked with an audio-frequency tone superimposed upon the carrier waves transmitted from the terminal station RT. In the case of the single area plan of Fig. 2, the stand-by channels may be marked with either the same tone or with different tones. However, in the case of the multiple area plan of Fig. 3, some of the stand-by channels should be marked with tones that are distinctively different from the tones used to mark the other stand-by channels.

The automatic tuning of the customers' station equipments can be accomplished by providing a scanning circuit for cyclically sweeping the frequency of the beating oscillator in each customer's radio receiver over a frequency range which is larger than the portion of the frequency spectrum occupied by one group of channels but smaller than that occupied by two groups of channels. During the idle condition, the scan would be centered on the particular assigned calling channel and would, therefore, not sweep over any other stand-by channel.

After a customer has been called, his radio equipment should now be tuned to an idle message channel over which a message will be transmitted to him, this idle channel being marked with a distinctive tone impressed upon its carrier. Consequently, the scanning should now be shifted to center on the middle channel of the customer's assigned group of channels. For example, when a radio set belonging to a customer in the second group is hunting for a marked idle channel, the scanning range will extend from below the C2 stand-by channel to above the C3 stand-by channel. If the radio set should fail to seize the marked idle channel, due perhaps to a momentary impairment in transmission, reception of the tone on the next stand-by channel C3 will veto any attempt to seize a marked message channel belonging either to the next higher group of channels or to the next lower group of channels over which the tuning of the receiver will be swept before it again encounters the tone on the assigned stand-by channel C2. The reception of the tone on the assigned stand-by channel C2 will, in this sequence, remove the seizure veto so that the marked channel may now be seized.

An alternative method would be to impress different tones or combinations of tones on the respective stand-by channels. On this basis, the scanning width would not have to be as narrow as in the other instance and could extend over several groups of channels. Consequently, the center of the scan would not need to be shifted when searching for a marked message channel. The seizure veto would be applied whenever an unassigned stand-by tone is received during the upward scanning sweep. It would also be applied by the quick return scan and would be lifted during the next cyclical sweep by the reception of the tone on the assigned stand-by channel.

The above-described channel assignment plan is suitable for use in a system having all its customers located in a single service area. It may also be employed in a system having its customers located in two or more adjacent service areas in which event one group of channels would be assigned for use by customers in one service area and a different group of channels would be assigned for use by customers in an adjacent area. If one or more of these areas has a large number of customers, such as might be the case in a big city, and the adjacent areas have a smaller number of customers, such as would be the case in rural sections, then it would not be necessary for a group of channels assigned for use in a rural area to include as many channels as a group assigned for use in a metropolitan area.

Figure 3:
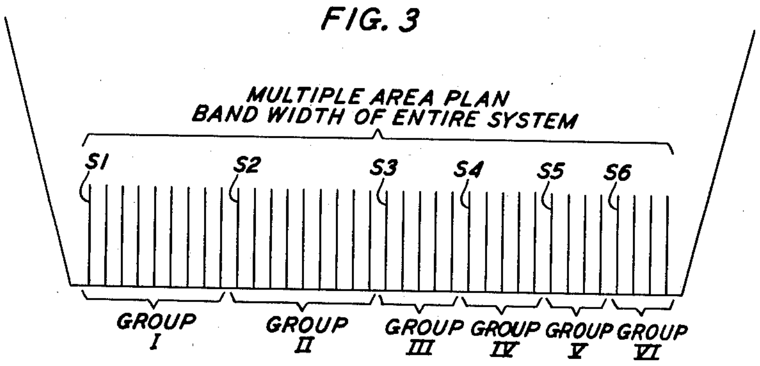
Fig. 3 represents a channel allocation plan for a multichannel radiant energy signaling system having a number of different groups of signaling stations located in several different service areas.

This multiple-area channel-assignment plan is illustrated in Fig. 3 in which it can be seen that a multiple-area system having 36 channels allotted to it is divided into six groups. Two of these groups are assigned to metropolitan areas and consist of nine channels each. In the remaining four groups, which are assigned to rural areas, two groups consist of five channels each and the other two groups are each composed of four channels. One channel, which may conveniently be the one of lowest frequency, is reserved in each group as a calling or stand-by channel. In Fig. 3, the six channels reserved for the transmission of selective calling signals are indicated by the reference characters S1 to S6, inclusive.

Any group of channels may be assigned for use by different groups of customers, provided all the customers in one group are in an area that is not adjacent to the area or areas in which the other customers are located and provided the distance separating the different customer areas is sufficient to prevent signaling interference. The rural area channels III to VI, inclusive, in addition to being assigned for local service with single-area customers, may also be employed for giving certain customers, having mobile radio telephone equipment, communication service in two or more areas alternatively. In this event, the selective calling signals from the terminal station can be transmitted to the multiple-area customers over the stand-by channels of the different groups of channels either simultaneously or sequentially. In this example, the stand-by channels S1 and S2 could both be marked with the same tone, but each of the other stand-by channels S3, S4, S5, and S6 should be marked by a tone that is distinctively different from the other stand-by tones.

Figs. 4 and 5 together illustrate the station equipment at a customer's station which may be considered as being representative of all the other customers' stations in the system shown in Fig. 1. This station equipment is shown to include a receiving antenna 1 for supplying the received carrier energy to a radio receiver R. In the radio receiver R, the received carrier energy is applied to a filter 2 having its output connected to an input of a demodulator 3. Another input to the demodulator 3 is supplied over a switch 601 with electric wave energy from a beating oscillator 4. The frequency of the energy produced by the beating oscillator 4 is varied in a manner that is described hereinafter. The resulting output of the demodulator 3 is supplied to the input of an intermediate frequency bandpass filter 5 having its output coupled to the input of a discriminator 6. As is indicated in Fig. 4, the filter 5 is designed to pass a band of frequencies centering around 70 megacycles which is the intermediate frequency of the receiving circuit in this particular embodiment of the invention. The output of the discriminator 6 is supplied to a long lead 8 having several junction points along its length, the last one being the junction point 7 shown in Fig. 5.

A portion of the output energy from the discriminator 6 travels along the lead 8 to the above-mentioned junction point 7 and is then supplied over a lead 9 to an automatic frequency control circuit 10 having its output coupled to a tank circuit 11. The output of the tank circuit 11 is delivered over a lead 12 and a switch 603 to the beating oscillator 4 for controlling its operating frequency. Connected to the tank circuit 11 is a variable capacitor 13 having a reciprocating plate 14 which is adapted to be moved back and forth due to the engagement of its pin 15 with a cam 16 which is rotated on a shaft 160 by a motor M. Another cam 135 is also mounted on the shaft 160 for rotation therewith as is further described hereinafter. One terminal of the motor M is connected through a manually operable "on-off" switch 17 to a source of operating power represented by the battery 18. The other terminal of the motor M extends along a lead 19 to a junction point 20 and then to other equipment described hereinafter.

Another portion of the output energy from the discriminator 6 travels along the lead 8 to one of a pair of armatures associated with a receive relay 21. When the receive relay 21 is energized, it operates its armatures to close a path extending from the lead 8 through the receiver 22 of a telephone handset 23 and then to ground 24. At intervals along the conductor 8, portions of the output energy from the discriminator 6 are taken off at the above-mentioned junction points and are applied to the windings of a number of relays 25, 26, 27, and 28 which are each of the "vibrating reed" or "resonance" type having a tuned reed which is set into strong vibration only when the frequency of the electric energy applied to its associated coil approximates the natural frequency of vibration of the reed. Another portion of the output from the discriminator 6 is taken off at the junction point 29 and is applied in parallel to the windings of four vibrating reed relays 31, 32, 33, and 34 having their armatures connected in series. Still another portion of the output from the discriminator 6 is taken off at the junction point 35 and is applied to the winding of a relay 36 having its armature connected by a lead 37 to a hook switch 38 which supports the telephone instrument 23 during idle periods.

The station equipment also includes an indicating lamp 39 which is illuminated when the equipment is tuned to its assigned selective calling channel. Another lamp 40 is adapted to be illuminated when all the message channels assigned for use by this station are busy. A bell 41 is so connected as to give an audible indication of the reception of the particular selective calling signal assigned to this station. A number of relays 42, 43, 44, 45, and 46 are provided for performing various functions that are described in detail hereinafter. One of these functions is to control the application of ground over conductors 47 and 48, as is described hereinafter, to the winding of the receive relay 21 for completing its energizing circuit to effect the operation of its armatures thereby connecting the lead 8 to the telephone receiver 22 as was described above. At a junction point 49 between the conductors 47 and 48, the ground potential applied to the conductor 47 is connected over a lead 50, a switch 605, and a lead 50*a* to a transmitting oscillator 51 in a radio transmitter T. The transmitting oscillator 51 is designed to go into operation for the generation of carrier energy in response to the connection of ground to the lead 50. It is to be noted that the telephone instrument 23 includes a telephone transmitter 52 which is connected by a lead 53, a switch 607, and a lead 53*a* to the transmitting oscillator 51 for modulating its carrier energy.

In order to automatically tune the mean frequency of the carrier energy produced in the radio transmitter T to the same two-way channel to which the radio receiver R is tuned, a portion of the output from the beating oscillator 4 in the radio receiver R is taken off at the junction point 54 and is applied over a lead 55 to one input of a modulator 56. Another input of the modulator 56 is supplied over a lead 57 with a portion of the output energy from the transmitting oscillator 51. The output energy from the modulator 56 is applied to the input of a frequency discriminator 58 designed to provide a maximum response to energy having a frequency value which is 70 megacycles plus or minus the value of the desired frequency separation between the two carrier frequencies constituting each two-way channel which, as was stated above, is 20 megacycles in this embodiment of the invention. The output of the discriminator 58 is connected to a second automatic frequency control circuit 59 for producing control potentials which are applied over a lead 60 to an input of the transmitting oscillator 51 for so controlling the mean frequency of the energy generated thereby as to maintain the desired constant frequency separation between the transmitting frequency and the receiving frequency. The carrier energy thus produced by the transmitting oscillator 51 is supplied through a filter 61 to a transmitting antenna 62 for radiation to the terminal station RT.

During the "stand-by" or idle condition of the customer's station equipment, the "on-off" switch 17 is closed so that current from battery 18 flows through the motor M and then along conductor 19 to the junction point 20. From the point 20, the current passes along a lead 81 to the inner break contact and inner left armature of relay 42, along a conductor 71*a*, over the second outermost left armature and contact of a relay 43, along a lead 71, through the lower contact and armature of the hook switch 38, along lead 37, and then over the armature and contact of relay 36 to ground 72. Accordingly, the motor M goes into operation and rotates the cam 16 which, through the intermediary action of the pin 15, causes the movable condenser plate 14 to vary cyclically the operating frequency of the beating oscillator 4 and, consequently, the tuning of the radio receiver R. The cam 16 is designed to advance the movable plate 14 progressively into proximity with the fixed plate of the condenser 13 so as to change its capacitance from a maximum value to a minimum value. When the point of minimum capacitance has been reached, the cam effects a rapid return to the point of maximum capacitance thereby producing a saw-tooth sweep of the frequency of the beating oscillator 4.

Thus, looking back at Fig. 2, for example, if the customer is allotted the second group of channels, then the cam 16 will cause the sweep of the beating oscillator 4 to begin at some frequency value in the first group of channel frequencies and end at a frequency value in the third group. Accordingly, during idle periods, the customer's station equipment will hunt for its assigned selective calling channel which, as was stated above, is marked by a distinctive stand-by tone, such as 500 cycles, taken from the source T1 in Fig. 1 and used to modulate the carrier produced by the radio transmitter TA. When this 500 cycle control tone is detected in the radio receiver R it will be applied along the conductor 8 to the tuned reed relays 25, 26, 27, 28, and 30.

One of these tuned relays, namely relay 25, is tuned to vibrate strongly at this frequency with the result that its armature becomes operated and closes a path for current to flow from the source 73, through the winding of relay 42, along a conductor 74, and then over the operated armature of relay 25 to ground 74*a*. Relay 42 consequently operates its armatures with its inner left armature opening the operating circuit of the motor M. This stops the rotation of the cam 16 thereby stopping the sweep action of the beating oscillator 4 which will now be held to the frequency of the calling channel by the action of the automatic frequency control circuit 10. At this time, a path is closed for current from battery 75 to flow through the lamp 39 over the right armature of relay 42 to ground 76 thereby lighting the lamp 39 to inform the customer that his station equipment is in the proper condition to receive a call or to originate a call. The movement of the inner left armature of relay 42 into engagement with its make contact closes a path extending from ground 72 over the armature of relay 36, along lead 37, over the lower contact of the hook switch 38, along lead 71, over the second outermost left armature and contact of relay 43, along lead 71*a*, over the make contact and inner left armature of relay 42, and then along a lead 77 to the contact of relay 33 for a purpose that is explained hereinafter.

As is indicated in Fig. 2, the customer is assigned eight channels for the transmission of message signals. However, there are two restrictions imposed on the use of these channels. Firstly, the customer cannot use a channel which is being used at that time by another customer. Secondly, even though several channels may be idle, the customer can initiate a call only over that one of the idle channels which is marked with a distinctive tone. This idle tone, which may be 600 cycles for example, is taken from the source T3 in Fig. 1 and is used by an operator at the terminal station RT for modulating the carrier of a selected one of the idle channels. After one of the customers places a call over the marked idle channel, the idle tone is removed from that channel by the terminal operator and is applied to another idle channel in the same group. By thus identifying the particular idle channel over which a customer should place a call, the supervisory duties of the terminal operator are simplified and calls can be placed in an orderly manner.

Assuming that the customer wishes to initiate a call and also assuming that his indicating lamp 39 is illuminated to indicate that his station equipment is in the proper condition to originate a call, then the customer removes his telephone instrument 23 from its hook switch 38 thereby permitting it to engage its upper contact. This closes a path for current from battery 18 to flow over the switch 17, through the motor M, along lead 19 to the junction point 20, along lead 81 to the junction point 82, over the contact and inner left armature of relay 44 to the junction point 83, along lead 84, over the upper contact of the hook switch 38, along lead 37, and then over the armature of relay 36 to ground 72. Closure of this path starts the motor M into operation for resuming the frequency-sweeping action of the beating oscillator 4 in order to scan the message channels in this group for one marked with the above-mentioned 600 cycle idle tone. When this occurs, the detected 600 cycle tone is applied along the lead 8 to the tuned reed relays 25, 26, 27, 28, and 30.

One of these tuned relays, namely relay 27, is tuned to vibrate strongly at this frequency with the result that its armature becomes operated and closes a path for current to flow from the source 85, through the right winding of relay 44, along lead 86, over the inner right armature and contact of relay 46, along lead 87, over the contact and second innermost left armature of relay 43, along lead 88, and then over the armature and contact of relay 27 to ground 89. This causes relay 44 to operate its armatures with its inner left armature opening the operating circuit of the motor M to stop the cam 16 on the marked idle message channel. The radio receiver R will now be held tuned to this channel by the action of the automatic frequency control circuit 10. In addition, the operation of the inner left armature of relay 44 closes a locking circuit for relay 44 extending from the source 90, over the operated inner left armature of relay 44 to the junction point 83, along the lead 84, over the upper contact of the hook switch 38, along lead 37, and then over the armature of relay 36 to ground 72. This locking circuit serves to maintain the relay 44 in an energized condition when the idle tone is subsequently removed as is explained hereinafter, to effect the de-energization of the tuned relay 27.

It should be noted that, when the tuning of the customer's radio receiver R was changed from the assigned selective calling channel to the marked idle channel, the tuned reed relay 25 was no longer supplied with the 500 cycle tone and, consequenty, released its armatures thereby opening the energizing circuit of relay 42 which thereupon released its armatures. The release of the inner left armature of relay 42 does not at this time affect the operation of the motor M due to the hook switch 38 being now in engagement with its upper contact. However, the release of the right armature of relay 42 opens the energizing circuit of the indicating lamp 39 thus causing it to become extinguished. As soon as relay 44 becomes energized and operates its armatures, its right armature connects ground 76 to a lead 93 extending to a terminal of the lamp 39 thereby enabling current from the source 75 to cause the lamp 39 to become illuminated again. This action of the lamp 39 serves to inform the customer that his radio receiver R is tuned to a marked idle channel.

During this time, the energization of relay 44 causes its outer left armature to become operated for closing a path from ground 72, along lead 37, over the upper contact of the hook switch 38, along lead 84 to the junction points 83 and 91, along lead 92, over the operated outer left armature of relay 44, along lead 47 to the junction point 49, along lead 48, and then through the winding of the receive relay 21 to a source 94 of electric current. This causes the receive relay 21 to operate its armatures, as was described above, to connect the telephone receiver 22 over the lead 8 to the output of the radio receiver R. The ground potential applied to the junction point 49 is also connected over a lead 50 to the transmitting oscillator 51 in the radio transmitter T. As was stated above, the transmitting oscillator 51 is designed to go into operation for the generation of carrier energy in response to the connection of ground to the lead 50. As was also explained above, the mean frequency of the carrier waves produced by the transmitting oscillator 51 is adjusted by the automatic frequency control circuit 59 to the value of the companion frequency of the two-way channel to which the radio receiver R is tuned. The carrier waves thus produced are radiated by the antenna 62 to the terminal station RT.

The reception of these carrier waves at the terminal station RT serves to inform the terminal operator that an incoming call has been placed over the marked idle channel. Accordingly, the terminal operator removes the 600 cycle tone from this channel thereby causing the tuned reed relay 27 at the customer's station to release its armature. However, relay 44 holds its armatures operated due to the above-described locking circuit extending over the upper contact of the hook switch 38. The terminal operator now applies the 600 cycle tone to another idle channel in the same group and proceeds to answer the customer's call.

At the termination of this call, the customer replaces his telephone instrument upon the hook switch 38 which consequently moves out of engagement with its upper contact and into engagement with its lower contact. This opens the locking circuit of relay 44 and causes it to release its armatures. The release of the outer left armature of relay 44 disconnects the ground 72 from the junction point 49 thereby causing the receive relay 21 to release its armatures for disconnecting the telephone instrument 22 from the radio receiver R. The removal of the ground 72 from the junction point 49 also discontinues the operation of the transmitting oscillator 51. The release of the right armature of relay 44 disconnects ground 76 from the lighting circuit of the indicating lamp 39. The resulting extinguishment of the lamp 39 provides the customer with an indication that the call has been terminated.

At this time, the engagement of the hook switch 38 with its lower contact closes the first circuit described above for operating the motor M which now proceeds to cause the frequency of the beating oscillator 4 to be swept, as explained above, in order to search for the assigned stand-by channel marked with the 500 cycle tone. When the radio receiver R is tuned to this stand-by channel, relay 42 becomes energized and performs the functions described above which include the stopping of the sweep action of the beating oscillator 4 and the lighting of the lamp 39 to inform the customer that his station equipment is again placed in the proper condition for receiving or initiating a call.

When a terminal operator at the radio terminal station RT wishes to communicate with one of the customers' stations, the operator selects an idle channel in the group of channels assigned for use by that particular group of customers' stations and transmits an answer tone, such as 700 cycles from the tone source T4, over that channel. This serves to reserve that particular channel for the transmission of the message. The operator next transmits the selective calling signal assigned to this customer's station over the stand-by channel assigned to this group of stations. As was stated above, one channel in each group of channels is reserved for the transmission of selective calling signals from the terminal station RT to the customers' stations. These signals may be of any suitable type known to those skilled in the art. In this embodiment of the invention, it is convenient to employ selective calling signals constituted by the simultaneous transmission of a combination of any four of a number of allotted tones with each customer's station in each group being assigned an exclusive combination of these tones. Selective calling signals of this type are disclosed in Patent 2,602,853, issued July 8, 1952, to H. C. Harrison. Each customer's station is provided with four tuned reed relays, similar to the relays 30, 31, 32, and 33 shown in Fig. 4, for responding to the respectively assigned selective calling signal.

For example, assuming that the terminal operator wishes to call the customer's station shown in Fig. 4 and has marked an idle channel with the 700 cycle answer tone and has transmitted the particular combination of selective calling tones assigned to that station over the stand-by channel of its group, then the reception of these tones at the customer's station will cause each of the four relays 30, 31, 32, and 33 to vibrate strongly with the result that their armatures, which are connected in series, become operated simultaneously as is explained in the above-mentioned patent to H. C. Harrison. It should be mentioned at this point that the 500 cycle stand-by tone is transmitted continuously in order to hold the station equipment at all the idle customers' stations automatically tuned to the assigned stand-by channel. Accordingly, the armatures of relay 42 will be operated so that a path will now be closed from ground 72 over the armature of relay 36, along lead 37, over the lower contact of the hook switch 38, along lead 71, over the contact and second outermost armature of relay 43, along lead 71a, over the inner left armature of relay 42 and its make contact, along lead 77, over the operated armatures of relays 30, 31, 32, and 33 in series, over a lead 95 to the junction point 119, along a lead 96a, and then through the right winding of relay 46 to a source 96 of electric current. Consequently, relay 46 now becomes energized and operates its armatures with its inner left armature closing a locking circuit extending from a source 97 of electric current to a junction point 98, along a portion of lead 71, over the lower contact of the hook switch 38, along lead 37, and then over the armature of relay 36 to ground 72.

The operation of the inner right armature of relay 46 opens the energizing circuit of relay 44 so that it cannot be energized by the 500 cycle idle tone during a subsequent sweep of the beating oscillator 4. The engagement of the outer right armature of relay 46 with its contact prepares a circuit for energizing relay 45 when the 700 cycle answer tone is received during a subsequent sweep of the beating oscillator 4. The operation of the outer left armature of relay 46 closes a path for current from battery 18 to flow over the switch 17, through the motor M, along lead 19 to the junction point 20, along lead 99, over the second innermost armature of relay 45, along lead 101, over the outer left armature of relay 46 to the junction point 98, along a portion of lead 71, over the lower contact of the hook switch 38, along lead 37, and then over the armature of relay 36 to ground 72. Closure of this path starts the motor M into operation for resuming the frequency-sweeping action of the beating oscillator 4 in order to scan the message channels in the assigned group for one marked with the above-mentioned 700 cycle answer tone.

Since one of the tuned reed relays, namely relay 28, is tuned to vibrate strongly at 700 cycles, the reception of the 700 cycle answer tone during the above-mentioned sweeping action causes the armature of relay 28 to become operated. This closes a path extending from ground 102, along lead 103, over the operated outer right armature of relay 46, along lead 103a to the junction point 118, along lead 104, over the outer right armature and contact of relay 43, along lead 104a, and then through the right winding of relay 45 to a source 105 of electric current. Accordingly, relay 45 now becomes energized and operates its armatures with its second innermost armature opening the above-described operating circuit of the motor M to stop the cam 16 in the proper position for tuning the radio receiver R to the idle channel marked with the 700 cycle answer tone. The operation of the second outermost armature of relay 45 closes a path extending from a source 107 of electric current, through the call bell 41, along lead 108 to the junction point 109, along a portion of the lead 71, over the lower contact of the hook switch 38, along lead 37, and then over the armature of relay 36 to ground 72. This causes the call bell 41 to ring thereby informing the customer at this station that he is being called.

It should be noted that when the operation of the outer left armature of relay 46 started the motor M into operation, the tuning of the radio receiver R was changed from the assigned stand-by channel frequency with the result that the tuned reed relay 25 became de-energized and released its armature which, in turn, effected the de-energization of relay 42. The resulting release of the right armature of relay 42 opened the energizing circuit of the indicating lamp 39 thereby causing it to become extinguished. The extinguishment of the lamp 39 at this time provides the customer with an additional indication that he is being called.

When the customer answers the call by picking up his telephone instrument 23, the hook switch 38 moves out of engagement with its lower contact and into engagement with its upper contact. This removes the ground 72 that was formerly applied over lead 37 to the lead 71 thereby discontinuing the operation of the call bell 41. At the same time, a locking circuit for relay 45 is closed from ground 72, over the armature of relay 36, along lead 37, over the upper contact of the hook switch 38, along conductor 84 to the junction point 111, over the operated innermost armature of relay 45, and then through the left winding of relay 45 to a source 112 of electric current. This serves to hold relay 45 energized after the 700 cycle answer tone is subsequently removed by the terminal operator. Consequently, the radio receiver R will remain tuned to this channel.

Also, at this time, a path is closed from ground 72 over the armature of relay 36, along lead 37, over the upper contact of the hook switch 38, along lead 84 to the junction point 113, along lead 114, over the operated outermost armature of relay 45 to the junction point 115, along lead 47 to the junction point 49, along lead 48, and then through the winding of the receive relay 21 to the source 94 of electric current. This causes the receive relay 21 to operate its armatures to connect the telephone receiver 22 over the lead 8 to the output of the radio receiver R. The ground potential thus applied to the junction point 49 is also connected over the lead 50 to the transmitting oscillator 51 in the radio transmitter T for starting it into operation, as was described above.

As was also explained above, the mean frequency of the carrier waves produced by the transmitting oscillator 51 is adjusted by the automatic frequency control circuit 59 to the value of the companion frequency of the two-way channel to which the radio receiver R is now tuned and these carrier waves are radiated by the transmitting antenna 62 to the radio terminal station RT. The reception of thees carrier waves at the radio terminal station RT serves to inform the terminal operator that the customer has answered the call. Accordingly, the terminal operator removes the 700 cycle answer tone from the selected channel, thereby causing the tuned relay 28 at the customer's station to release its armature. The terminal operator then proceeds with the transmission of a message over this channel.

It should be noted that, since all the customers' stations are provided with a relay similar to relay 45, it is necessary to control the energizing circuit of relay 45 not only with the armature of the tuned relay 28, but also with the outer right armature of relay 46 in order to insure that the transmission of the 700 cycle answer tone will energize the relay 45 at only that particular customer's station which has had its relay 46 energized by the transmission of its assigned selective calling signal. After the relay 45 has been energized, it must be maintained in this condition for the duration of the message period in order to hold the cam 16 in the proper position for keeping the radio receiver R tuned to the message channel which was selected by the application of the 700 cycle answer tone. As the transmission of the 700 cycle answer tone is discontinued when the terminal operator begins the transmission of the message, relay 45 is provided with the above-described locking circuit which is closed when the hook switch 38 engages its upper contact. However, before this locking circuit is closed by the movement of the hook switch 38 into engagement with its upper contact, the hook switch 38 moves out of engagement with its lower contact thereby opening the above-described locking circuit of relay 46.

Accordingly, means must be provided for holding the relay 46 energized during the travel time of the hook switch 38 as otherwise the release of the other right armature of relay 46 would open the energizing circuit of relay 45 which would consequently release its armatures and would, therefore, be unable to become locked in an energized condition. For this reason a varistor rectifier 117 is connected between the junction point 118 on the lead 104 and the junction point 119 on the lead 95 so as to provide a holding path over the operated outer right armature of relay 46 for the energized reed relay 28 to hold relay 46 energized. The holding path extends from ground 102, over the operated armature of relay 28, along lead 103, over the operated outer right armature of relay 46, along lead 103*a* to the junction point 118, through the varistor 117 to the junction point 119, along lead 96*a*, and then through the right winding of relay 46 to the source 96 of electric current. This allows relay 45 to become locked over its operated innermost armature and the upper contact of the hook switch 38. Since the 700 cycle answer tone is not removed until the carrier from this customer's station is received at the terminal station RT, relays 45 and 46 will be held energized until the terminal operator discontinues the transmission of the 700 cycle answer tone. When this occurs, relay 46 will release its armatures but relay 45 will remain locked over the above-described locking circuit through the upper contact of the hook switch 38.

At the termination of the message, the customer replaces his telephone instrument on the hook switch 38 which thereupon moves out of engagement with its upper contact and into engagement with its lower contact. This opens the locking circuit of relay 45 and causes it to release its armatures. The release of the outermost armature of relay 45 disconnects the ground 72 from the junction point 49 thereby causing the receive relay 21 to release its armatures for disconnecting the telephone instrument 22 from the radio receiver R. The removal of ground 72 from the junction point 49 also discontinues the operation of the transmitting oscillator 51.

The engagement at this time of the hook switch 38 with its lower contact closes the above-described circuit extending over the released inner left armature of relay 42 for operating the motor M which now proceeds to cause the frequency of the beating oscillator 4 to be swept, as explained above, in order to search for the assigned standby channel marked with the 500 cycle tone. When the radio receiver R becomes tuned to this stand-by channel, relay 42 is energized to perform the functions described above which include the stopping of the sweep action of the beating oscillator 4 and the lighting of the lamp 39 to inform the customer that his station equipment is again placed in the proper condition for receiving or initiating a call.

During communication periods, the output from the discriminator 6 in the radio receiver R is applied over the conductor 8 to a signal-to-noise ratio device which may be of any suitable design known to those skilled in the art. It could, for example, be essentially similar to the squelch control circuit described on page 653 of F. E. Terman's "Radio Engineers' Handbook." For the purpose of simplicity, this device is represented in Fig. 4 by the relay 36. Relay 36 is ordinarily not energized and its armature is shown to be in its released position wherein it engages its contact which is connected to the ground 72. The function of the relay 36 is to veto the use of the station equipment at any time when the signal-to-noise ratio decreases to a value such as to provide an unsatisfactory grade of service. When this occurs, relay 36 becomes energized and operates its armature. The movement of this armature out of engagement with its contact disconnects the ground 72 from the various operating circuits described above and thus suspends the operation of the station equipment until the quality of the received signaling energy becomes improved.

It can be understood from the description above that there are four situations during which a customer's station equipment may be going through a scanning process. These are: firstly, when the station equipment is initially turned on and is searching for its assigned stand-by channel; secondly, at the termination of a call when the equipment is seeking its assigned stand-by channel; thirdly, when a customer is attempting to initiate a call and has removed his telephone instrument 23 from the hook switch 38 to cause his station equipment to search for a channel marked with the 600 cycle idle tone; and fourthly, when the telephone instrument 23 has been lifted up in response to a call from the terminal station RT and the equipment is hunting for the channel marked with the 700 cycle answer tone. During all of these scanning processes, the equipment at each customer's station in each group must be prevented from seizing a channel assigned to another group of customers' stations.

Protection against seizing a stand-by channel assigned to another group of customers' stations is obtained in either of two ways. Firstly, when the groups of channels are large and the separation between the different stand-by channels is correspondingly large, the intrinsic accuracy and the amount of sweep in frequentcy of the local oscillator 4 may be relied upon to avoid sweeping the frequency of the receiver tuning over any but the correct stand-by channel. In this regard, it should be noted that, as was explained above, the scanning range is somewhat larger than the portion of the frequency spectrum occupied by one group of channels but is smaller than that occupied by two groups of channels; and that, in the idle condition, the scan is centered on the calling channel frequency. Secondly, when the groups of channels are small and the stand-by channels are not widely separated, protection against false seizure is obtained by marking the stand-by channels with respectively different tones.

This type of protection is not obtainable when either the 600 cycle idle tone or the 700 cycle answer tone is transmitted because these same tones are used with all groups of channels. Although it might be possible to employ idle and answer tones having frequencies that are respectively different for each group of channels, it is considered to be more desirable to use the same idle and answer tones for all groups of channels so as to simplify operating techniques at the terminal station and also to standardize the customers' station equipments as much as possible in order to facilitate their mass production and maintenance. Consequently, special protective means must be provided for preventing the customers' station equipments from responding to idle or answer tones transmitted over channels other than their assigned group of channels.

The means for preventing seizure of a channel assigned to another group of stations and marked with the 600 cycle idle tone will now be described. When a customer, such as the customer at the station shown in Figs. 4 and 5, attempts to initiate a call and removes his telephone instrument 23 from the hook switch 38, a frequency-sweeping action of the beating oscillator 4 is started as was discussed above. At the same time, the movement of the hook switch 38 into engagement with its upper contact prepares the above-described locking circuit of relay 44 for closure as soon as it operates its armatures in response to the reception of the 600 cycle idle tone. If this tone is not found on any of the channels in the group of channels assigned for use by this particular group of customers' stations, as would be the case if all of these channels should be busy, then means must be provided for preventing the relay 44 from becoming energized if this tone should be received during an extension of the sweep over an adjacent group of channels.

The means for preventing such an improper energization of the relay 44 include a tone source T2 at the terminal station RT. This tone source T2 supplies an audio frequency tone, such as 800 cycles, which is used as an upper limit marker to identify the channel of highest frequency in each group of channels. Since this 800 cycle upper limit tone is transmitted from the terminal station RT over the channel of highest frequency in each group of channels, it will be received by the radio receiver R when the sweep frequency of the beating oscillator 4 begins to move out of its assigned group of channels and into an adjacent group of channels. When this 800 cycle upper limit tone is detected, it will be applied along the lead 8 to the tuned reed relays 25, 26, 27, 28, and 30.

One of these tuned relays, namely relay 26, is tuned to vibrate strongly at this frequency with the result that its armature becomes operated and closes a path for current to flow from a source 121 through the right winding of relay 43, and along a lead 121*a* to the junction point 122*a*, along a lead 122, and then over the operated armature of relay 26 to ground 122*b*. Relay 43 consequently operates its armatures with its innermost left armature closing a locking circuit extending from a source 123 of electric current, along a lead 124, over the outer left released armature of relay 42, along the lead 84, over the upper contact of the hook switch 38, along lead 37, and then over the released armature of relay 36 to ground 72. The operation of the second innermost left armature of relay 43 disconnects the lead 88 from the lead 87, thereby opening the energizing circuit of relay 44 so that, even if the armature of the tuned relay 27 should become operated by the 600 cycle idle tone on a channel in another group, relay 44 would not become energized. The second outermost left armature of relay 43 is operated to disengage itself from its contact but this does not perform any useful function at this time. At the same time, the operation of the outermost left armature of relay 43 closes a path extending from ground 125, along a lead 126, and then through the busy lamp 40 to a source 127 of electric current. This serves to illuminate the lamp 40 thereby indicating to the customer that all the channels in the group assigned to him are busy. The operation of the inner right armature of relay 43 opens the energizing circuit of relay 132.

At this point, it is appropriate to state that protection against locking to the 700 cycle answer tone on a channel in an adjacent group of channels is obtained by means of the outer right armature and contact of the upper limit relay 43 for controlling a portion of the energizing circuit of the answer relay 45. As was stated above, another portion of the energizing circuit of the answer relay 45 is controlled by the normally disengaged outer right armature and contact of the selective calling relay 46. Thus, the answer relay 45 cannot be energized unless the selective calling relay 46 has first become energized in response to the reception of its particular selective calling signal which is individual to each customer's station in the group. However, if by some chance this particular selective calling signal should be received during an extension of the sweep over an adjacent group of channels, the answer relay 45 is prevented from being energized if the 700 cycle answer tone is then encountered. This is due to the fact that, when the sweep passes from the assigned group of channels into an adjacent group of channels, the 800 cycle upper limit tone will be received and will effect the energization of the upper limit relay 43 as was described above. When relay 43 operates its armatures, the operation of its outer right armature disconnects the lead 104*a* from the lead 104 thus opening this portion of the energizing circuit of the answer relay 45 and preventing it from becoming energized during an extension of the sweep over an adjacent group of channels.

At the termination of the upward sweep the scan is returned to its initial position and the sweep is resumed. During the resumption of the upward sweep, the 500 cycle stand-by tone will be received. As was stated above, this tone marks the assigned selective calling channel which is the channel of lowest frequency in the group of channels assigned to this group of customers' stations. Reception of the 500 cycle tone effects the operation of the armature of relay 25 which, as was described above, causes the energization of the stand-by relay 42 which operates its armatures. Operation of the outer left armature of relay 42 opens the locking circuit of the upper limit relay 43 and causes it to release its armatures. The release of the second innermost left armature of relay 43 connects the lead 88 to the lead 87 to complete this portion of the energization circuit of the idle relay 44. The release of the outermost left armature of relay 43 opens the illuminating circuit of the lamp 40. The resulting extinguishment of the lamp 40 at this time serves to inform the customer that the channel-scanning operation is being repeated.

If no idle channel is found during the next scan over the channels in this group and if the telephone instrument 23 is still off the hook switch 38, relay 43 will again become energized by the 800 cycle limit tone. This cycle of operations will be repeated until an idle channel is found in the assigned group of channels or until the telephone instrument is returned to the hook switch 38.

It is to be understood that, if desired, the 800 cycle tone which is used as an upper limit marker for this particular group of channels may be used in addition as a stand-by tone for making the selective calling channel in the next higher adjacent group of channels, this channel being the channel of lowest frequency in this group as was explained above. In this case, the reception of the stand-by tone in the next adjacent group of channels will veto any attempt to seize a marked idle channel in this group.

Instead of using an upper limit tone, the same functions can be performed by means which will now be described. When the armature of relay 25 is in its released position, a path is closed from ground 74*a*, over the released armature of relay 25, along lead 74*b*, over the contact and inner right armature of relay 43, along a lead 129, and then through the winding of a relay 132 to a source 130 of electric current. This causes relay 132 to operate its armatures and lock-up over its inner armature, lead 137, and then over a cam follower 136 and its lower contact to ground 131. The cam follower 136 rides on a cam 135 which is mounted on the same shaft 160 as the cam 16. The operation of the outer armature of relay 132 closes a path from the junction point 122*a*, along a lead 139 to the junction point 140, along a lead 133, and then over the outer armature of relay 132 to the make-before-break contact of the outer left armature of relay 42.

At the time when the cam 16 moves the reciprocating plate 14 of the variable capacitor 13 to a point approaching the upper limit of the sweep, the tip of the cam 135 will cause the cam follower 136 to become disengaged from its lower contact and to move into engagement with its upper contact. This opens the locking circuit of relay 132 which thereupon releases its armatures. At the same time, ground 131 is applied over the cam follower 136, along the lead 138 to the junction point 140, along lead 139 to the junction point 122*a*, along lead 121*a*, and then through the right winding of the upper limit relay 43 to the source 121. Relay 43 will accordingly operate its armatures to perform the functions described above.

When the scan returns to its initial position, the cam 135 will be in a position such as to permit its cam follower 136 to engage its lower contact to apply ground 131 to the locking lead 137 of relay 132. Since the 500 cycle stand-by tone is not received at the extreme lower position of the scan, relay 25 will now be in an unenergized condition. Relay 132 will be unenergized because the circuit for its operating winding is broken by the operated inner right armature of relay 43. When the 500 cycle stand-by tone is received during the first portion of the upward sweep, it effects the energization of relay 25 which, in turn, effects the energization of the stand-by relay 42. The operation of the outer left armature of relay 42 will now open the locking circuit of the upper limit relay 43 which thereupon releases its armatures thus restoring the relay circuits to their previous condition.

An alternative method for maintaining the constant 20 megacycle frequency separation between the transmitting and receiving portions of the system is illustrated in Fig. 6. When it is desired to use the organization shown in Fig. 6, the switches 601, 603, 605, and 607 in the circuit of Fig. 4 are each operated to their opposite positions; that is, they are each moved out of engagement with that one of their contacts which is shown to be engaged in Fig. 4, and into engagement with the other one of their contacts which is shown to be disengaged in Fig. 4. When this is done, the conductors 50 and 53, shown in Fig. 4, will now be connected to leads 606 and 608, respectively, extending to a modified radio transmitter MT which is basically the same as the transmitter T of Fig. 4. The modified radio transmitter MT is shown in Fig. 6 to include a transmitting oscillator 609 connected to a modulator 610 having its output supplied through an amplifier 611 and a filter 612 to a transmitting antenna 613. The transmitting oscillator 609 has a mean operating frequency of 50 megacycles. It is similar to the transmitting oscillator TO of Fig. 4 in that it is designed to go into operation in response to the connection of ground to the lead 50 and is modulated with signals applied over the lead 53.

The organization of Fig. 6 also includes a stable crystal controlled oscillator 614 having its output connected to a frequency multiplier 615 which raises the frequency of the applied energy. This energy is delivered to one input of a modulator 616 which has its other input supplied with energy from a variable low frequency oscillator 617. The frequency of the electric energy generated by the oscillator 617 is varied by the sweep potentials applied over the lead 12, switch 603, and lead 604. Thus, the frequency of the oscillator 617 is cyclically varied in much the same manner as that of the beaming oscillator 4 in Fig. 4. This low frequency sweep energy is superimposed in the modulator 616 on the ultra high frequency energy produced by the frequency multiplier 615 and the resulting energy is supplied to a filter 618 having its output coupled to a junction point 619.

A portion of the energy from the junction point 619 is applied along the lead 602 and switch 601 to the demodulator 3 of Fig. 4. Another portions is delivered over a lead 620 to an input of the modulator 610. Since the center frequency of the intermediate frequency filter 5 of Fig. 4 is 70 megacycles and the mean operating fequency of the transmitting oscillator 609 is 50 megacycles, and since both the demodulator 3 and the modulator 610 are supplied with the same sweep potentials from the junction point 619 their outputs will be varied in the same degree at the same time so that the desired 20 megacycle frequency separation between the transmitting and receiving circuits will be maintained. A particular advantage derived from the use of this organization as compared with that shown in Fig. 4 is that it minimizes the amount of undesired frequency modulation that might tend to be produced by microphonics originating in the oscillators.

The circuits shown in the drawing and described above have been presented in order to explain the principles and features of operation of the invention. It is to be understood that the invention is not limited to the specific circuit constructions shown in the drawing as various modifications may be made without exceeding the scope of the invention which is to be limited only by the claims appended hereto.

What is claimed is:

1. A radiant energy signaling system having allotted thereto for signaling purposes a plurality of groups of radiant energy signaling channels closely spaced within an assigned portion of the frequency spectrum, said system comprising in combination a first radiant energy signaling station having a plurality of radiant energy transmitters for transmitting carrier waves over any of the channels in any of said groups, a second radiant energy signaling station having receiving means for receiving carrier waves transmitted from said first station over certain of said channels, variable tuning means at said second station for cyclically sweeping the tuning of said receiving means over a section of said assigned portion of the frequency spectrum, said section including all of the channels in a first one of said groups and certain of the channels in the adjacent groups immediately lower and higher in frequency than said first group, a source of low frequency control tone at said first station, means for selectively connecting said control tone source to any one of several of said transmitters transmitting carrier waves over channels in said first group and said adjacent groups, first tuned means at said second station actuated only in response to the reception thereat of said control tone, a first relay at said second station, a circuit for energizing said first relay, said circuit having first and second normally open portions both connected in series, means for closing the first one of said normally open portions only in response to the actuation of said first tuned means, means at said first station for transmitting tone selective calling signals, second tuned means at said second station actuated only in response to the reception thereat of an assigned combination of said tone selective calling signals, a second relay at said second station, means for energizing said second relay only in response to the actuation of said second tuned means, and means for closing the second one of said normally open portions of said circuit only in response to the energization of said second relay.

2. A radiant energy signaling system having allotted thereto for signaling purposes a plurality of groups of radiant energy signaling channels closely spaced within an assigned portion of the frequency spectrum, said system comprising in combination a first radiant energy signaling station having a plurality of radiant energy transmitters for transmitting carrier waves over any of the channels in any of said groups, a second radiant energy signaling station having receiving means for receiving carrier waves transmitted from said first station over certain of said channels, variable tuning means at said second station for cyclically sweeping the tuning of said receiving means over a section of said assigned portion of the frequency spectrum, said section including all of the channels in a first one of said groups and certain of the channels in the adjacent groups immediately lower and higher in frequency than said first group, a plurality of sources of different low frequency control tones at said first station, means for connecting a first one of said control tone sources to that one of said transmitters which is transmitting carrier waves over the channel of highest frequency in said first group, means for selectively connecting a second one of said control tone sources to any one of several of the other of said transmitters transmitting carrier waves over channels in said first group and said adjacent groups, first tuned means at said second station actuated only in response to the reception thereat of said second control tone, first control means responsive only to the actuation of said first tuned means for effecting the stopping of the sweep action of said variable tuning means, second tuned means at said second station actuated only in response to the reception thereat of said first control tone, and second control means responsive only to the actuation of said second tuned means for effecting the disablement of said first control means.

3. A radiant energy signaling system in accordance with claim 2 and having a locking circuit for holding said second control means in its responsive condition, said locking circuit being normally open, means for closing said locking circuit when said second control means responds to the actuation of said second tuned means, means at said first station for connecting a third one of said control tone sources to that one of said transmitters which is transmitting carrier waves over the channel of lowest frequency in said first group, third tuned means at said second station actuated only in response to the reception thereat of said third tone, and third control means responsive only to the actuation of said third tuned means for effecting the opening of said locking circuit and the enablement of said first control means.

4. A radiant energy signaling system having allotted thereto for signaling purposes a plurality of groups of radiant energy signaling channels closely spaced within an assigned portion of the frequency spectrum, said system comprising in combination a first radiant energy signaling station having a plurality of radiant energy transmitters for transmitting carrier waves over any of the channels in any of said groups, a second radiant energy signaling station having receiving means for receiving carrier waves transmitted from said first station over certain of said channels, said receiving means including an electric tunable oscillator, variable tuning means at said second station for cyclically sweeping the tuning of said receiving means over a section of said assigned portion of the frequency spectrum, said section including all of the channels in a first one of said groups and certain of the channels in the adjacent groups immediately lower and higher in frequency than said first group, said variable tuning means including variable impedance means for cyclically varying the operating frequency of said oscillator in a saw-tooth manner, control means having an operating condition for continuously varying said impedance means, said control means also having a non-operating condition for holding said impedance means constant, a plurality of sources of different low frequency control tones at said first station, means for connecting a first one of said control tone sources to that one of said transmitters which is transmitting carrier waves over the channel of highest frequency in said first group, means for selectively connecting a second one of said control tone sources to any one of several of the other of said transmitters transmitting carrier waves over channels in said first group and said adjacent groups, first frequency-responsive means at said second station responsive only to the reception thereat of said second tone for effecting the placing of said control means in its non-operating condition, and second frequency-responsive means at said second station responsive only to the reception thereat of said first tone for rendering said first frequency-responsive means ineffectual whereby said control means is maintained in its operating condition.

5. A radiant energy signaling system in accordance with claim 4 and having indicating means at said second station, said indicating means being normally unoperated, means for operating said indicating means by the response of said second frequency-responsive means to said first tone, means at said first station for connecting a third one of said control tone sources to that one of said transmitters which is transmitting carrier waves over the channel of lowest frequency in said first group, third frequency-responsive means at said second station responsive only to the reception thereat of said third tone for rendering said first frequency-responsive means effectual after it has been rendered ineffectual by said second frequency-responsive means and for effecting the discontinuance of the operation of said indicating means, said third frequency-responsive means including a resonant relay tuned to respond only to said third tone.

6. A radiant energy signaling system having allotted thereto for signaling purposes a plurality of groups of radiant energy signaling channels closely spaced within an assigned portion of the frequency spectrum, said system comprising in combination a first radiant energy signaling station having a plurality of radiant energy transmitters for transmitting carrier waves over any of the channels in any of said groups, a second radiant energy signaling station having receiving means for receiving carrier waves transmitted from said first station over certain of said channels, variable tuning means at said second station for cyclically sweeping the tuning of said receiving means over a section of said assigned portion of the frequency spectrum, said section including all of the channels in a first one of said groups and certain of the channels in the adjacent groups immediately lower and higher in frequency than said first group, a plurality of sources of different low frequency control tones at said first station, means for selectively connecting said control tone sources to said transmitters for modulating their carriers, said second station including a plurality of resonant relays each having an armature, each of said relays being tuned to actuate its armature only in response to the reception thereat of a respectively different one of said control tones, a plurality of electroresponsive means at said second station for controlling diverse operations of said variable tuning means, and a plurality of control circuits at said second station for controlling the energization of each of said electroresponsive means separately and independently, each of said control circuits including an armature of a respectively different one of said resonant relays.

7. A radiant energy signaling system having allotted thereto for signaling purposes a plurality of groups of radiant energy signaling channels closely spaced within an assigned portion of the frequency spectrum, said system comprising in combination a first radiant energy signaling station having a plurality of radiant energy transmitters for transmitting carrier waves over any of the channels in any of said groups, a second radiant energy signaling station having receiving means for receiving carrier waves transmitted from said first station over certain of said channels, variable tuning means at said second station for cyclically sweeping the tuning of said receiving means over a section of said assigned portion of the frequency spectrum, said section including all of the channels in a first one of said groups and certain of the channels in the adjacent groups immediately lower and higher in frequency than said first group, a plurality of sources of different low frequency control tones at said first station, means for connecting a first one of said control tone sources to that one of said transmitters which is transmitting carrier waves over the channel of highest frequency in said first group, means for selectively connecting a second one of said control tone sources to any one of several of the other of said transmitters transmitting carrier waves over channels in said first group and said adjacent groups, first tuned means at said second station actuated only in response to the reception thereat of said second control tone, a first relay at said second station, a first circuit for energizing said first relay, said first circuit having two normally closed portions and a normally open portion, all three of said portions being connected in series, means for closing said normally open portion in response to the actuation of said first tuned means, second tuned means at said second station actuated only in response to the reception thereat of said first control tone, a second relay at said second station, means for energizing said second relay only in response to the actuation of said second tuned means, means for opening a first one of the normally closed portions of said first circuit only in response to the energization of said second relay, means at said first station for transmitting tone selective calling signals, third tuned means at said second station actuated only in response to the reception thereat of an assigned combination of said tone selective calling signals, a third relay at said second station, means for energizing said third relay only in response to the actuation of said third tuned means, and means for opening a second one of the normally closed portions of said first circuit only in response to the energization of said third relay.

8. A radiant energy signaling system having allotted thereto for signaling purposes a plurality of groups of radiant energy signaling channels closely spaced within an assigned portion of the frequency spectrum, said system comprising in combination a first radiant energy signaling station having a plurality of radiant energy transmitters for transmitting carrier waves over any of the channels in any of said groups, a second radiant energy signaling station having receiving means for receiving carrier waves transmitted from said first station over certain of said channels, variable tuning means at said second station for cyclically sweeping the tuning of said receiving means over a section of said assigned portion of the frequency spectrum, said section including all of the channels in a first one of said groups and certain of the channels in the adjacent groups immediately lower and higher in frequency than said first group, driving means for driving said variable tuning means, circuit means for controlling the starting and stopping of said driving means, a telephone instrument at said second station, means for connecting said telephone instrument to said receiving means, a holder for holding said telephone instrument during idle periods, said holder having a first position when holding said telephone instrument and a second position when said telephone instrument is removed for use, a plurality of contacts actuated by the movement of said holder from one of its positions to the other, a first one of said contacts being actuated for closing a first portion of said circuit means for starting said driving means when said holder is in its first position, a plurality of sources of different low frequency control tones at said first station, means for connecting a first one of said control tone sources to that one of said transmitters which is transmitting carrier waves over the channel of lowest frequency in said first group, first frequency-responsive means at said second station responsive only to the reception thereat of said first tone for effecting the opening of a second portion of said circuit means for stopping said driving means, said second portion of said circuit means being connected in series with said first portion, means at said first station for transmitting tone selective calling signals, second frequency-responsive means at said second station actuated only in response to the reception thereat of an assigned combination of said tone selective calling signals for closing a third portion of said circuit means for starting said driving means, said third portion of said crcuit means beng connected in parallel with said second portion and in series with said first portion, means at said first station for selectively connecting a second one of said control tone sources to any one of several of the other of said transmitters transmitting carrier waves over channels in said first group and said adjacent groups, third frequency-responsive means at said second station responsive only to the reception thereat of said second tone for effecting the opening of a fourth portion of said circuit means for stopping said driving means, said fourth portion being connected in parallel with said second portion and in series with said third and first portions, and a signal-to-noise ratio-responsive device at said second station responsive only to an increase in the signal-to-noise ratio thereat for effecting the opening of a fifth portion of said circuit means for stopping said driving means, said fifth portion being connected in series with all of said other portions.

9. A radiant energy signaling system in accordance with claim 8 and having a second one of said contacts actuated for closing a sixth portion of said circuit means for starting said driving means when said holder is in its second position, said sixth portion being connected in parallel with said first portion, means at said first station for selectively connecting a third one of said control tone sources to any one of several of the other of said transmitters transmitting carrier waves over channels in said first group and said adjacent groups, and fourth frequency-responsive means at said second station responsive only to the reception thereat of said third tone for effecting the opening of a seventh portion of said circuit means, said seventh portion being connected in series with said sixth portion and in parallel with said third and fourth portions.

10. A radiant energy signaling system comprising in combination at least two signaling stations, said system having allotted thereto for the transmission of carrier waves between said stations a plurality of two-way radiant energy signaling channels closely spaced within an assigned portion of the frequency spectrum, each of said stations having transmitting means for transmitting carrier waves over said channels and receiving means for receiving carrier waves transmitted over said channels, said transmitting means including a transmitting oscillator and said receiving means including a beating oscillator, each of said two-way channels having a first carrier frequency for the transmission of carrier waves in only one direction between said stations and a second carrier frequency for the transmission of carrier waves in only the opposite direction between said stations, each two-way channel having a constant frequency separation between said first and second carrier frequencies, the value of said frequency separation being uniform for all of said channels, a first one of said stations having variable tuning means for cyclically sweeping the tuning of the receiving means thereat over said assigned portion of the frequency spectrum, means for stopping the sweep action of said variable tuning means with the receiving means tuned to one of the carrier frequencies of a selected one of said two-way channels, said receiving means at said first station including a bandpass filter having a passband centering around an assigned frequency value, said first station also having control means for changing the effective operating frequency of the transmitting means thereat to the companion frequency of said selected two-way channel and for maintaining said constant frequency separation between the two carrier frequencies constituting said selected channel, said control means including a modulator having one input supplied with electric energy from the beating oscillator at said first station and having another input supplied with electric energy from the transmitting oscillator thereat, a frequency discriminator having an input supplied with electric energy from an output of said modulator, said frequency discriminator being designed to provide a maximum response to input energy having a frequency value which is separated from the value of said assigned frequency value by the value of said uniform frequency separation, an automatic frequency control circuit for producing control potentials and having an input supplied with electric energy from an output of said discriminator, and means for applying said control potentials to said transmitting oscillator for controlling its operating frequency.

11. A radiant energy signaling system comprising in combination at least two signaling stations, said system having allotted thereto for the transmission of carrier waves between said stations a plurality of two-way radiant energy signaling channels closely spaced within an assigned portion of the frequency spectrum, each of said stations having transmitting means for transmitting carrier waves over said channels and receiving means for receiving carrier waves transmitted over said channels, each of said two-way channels having a first carrier frequency for the transmission of carrier waves in only one direction between said stations and a second carrier frequency for the transmission of carrier waves in only the opposite direction between said stations, each two-way channel having a constant frequency separation between said first and second carrier frequencies, the value of said frequency separation being uniform for all of said channels, the transmitting means at a first one of said stations including a first modulator and a transmitting oscillator having a mean operating frequency of a first assigned value, the output of said transmitting oscillator being coupled to an input of said first modulator, the receiving means at said first station including a demodulator and a bandpass filter having a passband centering around a second assigned frequency value, the difference between said first and second assigned frequency values being the same as the value of said uniform frequency separation, said first station having a source of electric energy of stable frequency and a second modulator thereat, said second modulator having one input coupled to said source and having its output coupled to an input of said demodulator, a variable low frequency oscillator having its output coupled to another input of said second modulator, said first station also having variable tuning means for cyclically varying the frequency of said low frequency oscillator for cyclically sweeping the tuning of the receiving means thereat over said assigned portions of the frequency spectrum, and means for stopping the sweep action of said variable tuning means with the receiving means tuned to one of the carrier frequencies of a selected one of said two-way channels, said first station also having control means for changing the effective operating frequency of the transmitting means thereat to the companion frequency of said selected two-way channel and for maintaining said constant frequency separation between the two carrier frequencies constituting said selected channel, said control means including means for coupling the output of said second modulator to an input of said first modulator.

References Cited in the file of this patent

UNITED STATES PATENTS

| | | |
|---|---|---|
| 1,464,565 | Espenschied et al. | Aug. 14, 1923 |
| 2,137,023 | Monk | Nov. 15, 1938 |